BEST AVAILABLE COPY

A. J. HODGES.

Harvester.

No. 9,279. Reissued July 6, 1880.

Witnesses
Fred G. Dutrich
B. L. Dutrich

Inventor
Andrew J. Hodges
by W. B. Richards
Atty.

N. PETERS, PHOTO-LITHOGRAPHER, WASHINGTON, D. C.

BEST AVAILABLE COPY

UNITED STATES PATENT OFFICE.

ANDREW J. HODGES, OF PEORIA, ILLINOIS.

HARVESTER.

SPECIFICATION forming part of Reissued Letters Patent No. 9,279, dated July 6, 1880.

Original No. 147,773, dated February 24, 1874. Application for reissue filed March 9, 1880.

*To all whom it may concern:*

Be it known that I, ANDREW J. HODGES, of Peoria, in the county of Peoria and State of Illinois, have invented certain new and useful Improvements in Harvesters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
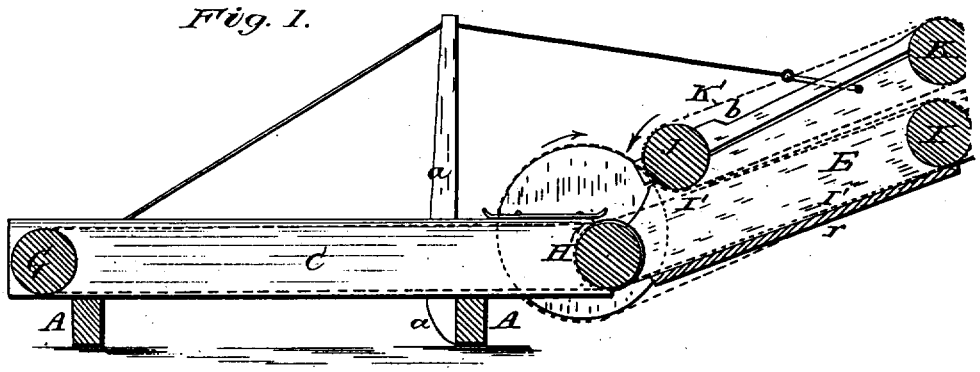
Figure 2:
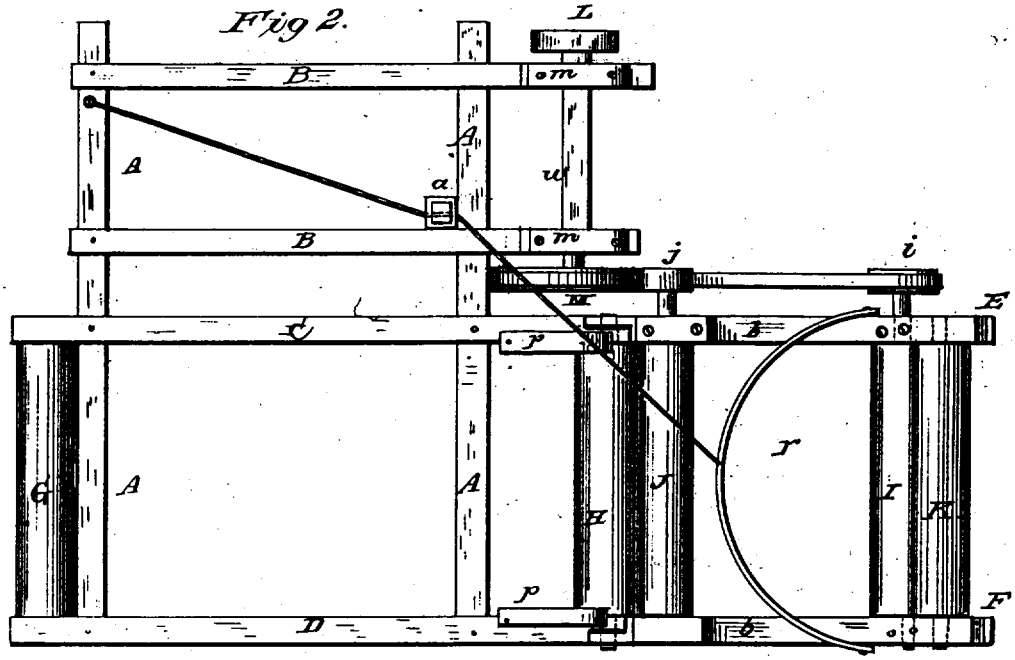

Figure 1 is a longitudinal vertical section through the center of the platform and elevator. Fig. 2 is a plan, with the carriers removed, to show the rollers, &c.

My invention consists in an arrangement of band-pulleys and band, in connection with rollers bearing a carrier or apron above the platform-carrier, which extends to the top of the elevating-spout, in such manner that the said band of the driving-pulley located on the platform, which passes around the pulley of the platform-carrier at the top of the elevator-spout, also passes along the surface of a lower pulley of a parallel auxiliary carrier in the spout to drive it, the grain being carried up between and by said carriers. The elevating-spout, by this arrangement, maintains the operating connection of its pulley-bands, rollers, and carriers, whatever the ascending angle of the spout may be.

I attain these objects by the mechanism illustrated in the accompanying drawings, in which A A represent the frame of the grain-platform; B B, cross-bars which support the driving-pulleys L M and their shaft *w;* C, the rear beam of platform; D, the front bar of same, called the "sickle-bar," both bolted to the frame A A; E F, the sides of the elevator, each hinged or pivoted upon the axle of the platform-roller H at this end of the platform, and having a bottom board, *r*.

*b b* are wooden springs attached to the upper end of the sides E F, respectively, in such a manner as to permit the lower roller, J, of the upper carrier, which is pivoted on said springs, to yield to the passage of the cut grain, at the same time to obtain a tension of the pulley *j* on said roller upon the bight of the band running around the large pulley M and the pulley *i* of the carrier; G, the carrier-roller at left end of the platform; H, the roller of same carrier at the junction of the platform and elevator, and forming the hinged connection of the two; I, the lowermost of the rollers at the upper end of the elevator which carries the platform-carrier I′. Its outer end carries a pulley, *i*, whence runs a band under pulley *j* of the roller J, around the large pulley M in the rear of the platform.

J is the lower roller of the upper carrier pivoted at either end in a spring attached to each side of the elevator sides E F, and bearing at its outer end a pulley, *j*, which is kept tensely against the band which connects the pulleys M *i;* K, the uppermost roller of the elevator, at the outer end of the same, and which carries the carrier which encircles this and the other roller, J, described above.

The driving-pulley M and its band running over the pulley *i*, in the upper end of the elevator-spout E, rotates the lower carrier or apron, I′, on the rollers G H I. The upper carrier, K′, confined to the spout and rollers K J, is rotated by the contact of the pulley *j*, on the end of the carrier-roller J, with said band at any angle in which the said spout may be placed, thus carrying up the grain between the carriers I′ and K′. The upper carrier, K′, will hold the grain and prevent it being blown or shaken off of the lower carrier.

I do not claim, broadly, in combination with the grain-platform of a harvester, an adjustable hinged elevator-frame having two elevator-aprons, as such is not of my invention; but

What I claim as new, and desire to secure by Letters Patent, is—

1. In combination with the hinged adjustable elevator-spout E F, platform-carrier I, pulley M, and belt connecting it with the pulley *i*, the upper carrier, K′, and pulley J, journaled in spring-bars *b*, which allow the carrier K′ to yield upward and hold the pulley J in contact with said band, substantially as and for the purpose specified.

2. The combination of the band-pulley M, band-pulley *j* of roller J, and band-pulley *i* of platform-carrier roller I, so that each of said pulleys are rotated by the same band, whatever the inclination of the elevator-spout may be, substantially as and for the purposes set forth.

In testimony that I claim the foregoing I have hereunto set my hand this 4th day of March, 1880.

ANDREW J. HODGES.

Witnesses:
H. R. WILBER,
F. O. HALL.